United States Patent [19]

Miller et al.

[11] Patent Number: 4,777,292

[45] Date of Patent: Oct. 11, 1988

[54] PREPARATION OF ORTHO-METHYL ANILINES FROM ORTHO-AMINO BENZYL SULFOXIDES

[75] Inventors: Michael J. Miller, Creve Coeur; John P. Chupp, Kirkwood, both of Mo.

[73] Assignee: Monsanto Company, St. Louis, Mo.

[21] Appl. No.: 701,275

[22] Filed: Feb. 13, 1985

Related U.S. Application Data

[62] Division of Ser. No. 358,773, Mar. 17, 1982, abandoned.

[51] Int. Cl.[4] .............................................. C07C 87/50
[52] U.S. Cl. ..................... 564/305; 564/102; 564/282; 564/440; 558/412; 558/418; 560/19
[58] Field of Search ............... 564/440, 305; 260/40 E

[56] References Cited

U.S. PATENT DOCUMENTS 4,480,130 10/1984 Ku ...................................... 564/440
4,496,765 1/1985 Ku et al. ............................. 564/440

OTHER PUBLICATIONS

Adams et al., "Organic Reactions", vol. 7, pp. 277-280 (1953).
Grossman et al., "Tetrahedron Letters", vol. 6, pp. 497-500 (1922).

Primary Examiner—Robert V. Hines
Attorney, Agent, or Firm—Robert B. Martin

[57] ABSTRACT

This invention relates, in one of its aspects, to a process for the preparation of ortho-methyl anilines from ortho-amino benzyl sulfoxides. An ortho-amino benzyl sulfoxide is converted to an ortho-amino benzyl halide by reaction with a nonoxidizing acid halide and is converted to a stable quaternary salt by reaction with a tertiary amine in the presence of an alcohol. The quaternary salt may be cleaved by hydrogenation to form ortho-methyl anilines. Other aspects of the invention relate to novel intermediate quaternary salts and to a process for forming those quartenary salts.

15 Claims, No Drawings

PREPARATION OF ORTHO-METHYL ANILINES FROM ORTHO-AMINO BENZYL SULFOXIDES

This is a division of application Ser. No. 358,773, filed Mar. 17, 1982, and now abandoned.

BACKGROUND OF THE INVENTION

1. Field of the Invention

This invention relates, in one of its aspects, to a process for the preparation of ortho-methyl anilines from ortho-amino benzyl sulfoxides. Other aspects of the invention relate to novel intermediate quaternary salts and to a process for forming those quaternary salts.

2. Description of the Prior Art

Sulfoxides of the general formula RSOR are known to undergo rearrangements under acid conditions to produce alpha-substituted sulfides, the overall result being reduction of the sulfoxide group and oxidation of the adjacent carbon atom. Reactions of this type are generally known as the Pummerer reaction. The products of such Pummerer reactions when acid halides are employed normally include alpha-substituted halomethyl sulfides, or via hydrolysis, the corresponding aldehydes. Russel & Mikol, Mech. Mol. Migr., 1, 157–207 (1968).

In the preparation of certain aniline derivatives useful as herbicides, various methods have been developed, for example, for the reduction of ortho-methylthiomethyl anilines or ortho-methylsulfinylmethyl anilines to ortho-methyl anilines. Once such reaction involves use of the prior art direct hydrogenation of the sulfide in the presence of a catalyst such as Raney nickel. Use of Raney nickel for desulfurization, however, requires substantial amounts of catalyst, special equipment and special handling.

While use of an ortho-amino benzyl sulfoxide as a starting material to produce anilines can be attractive, particularly when the aniline contains other ring substituents, the presence of sulfur in the starting material is detrimental if hydrogenation employing metal hydrogenation catalysts, such as noble metal catalysts, is contemplated.

It is an object of this invention to provide a process for the conversion of ortho-amino benzyl sulfoxides to ortho-methyl anilines in high yields.

It is a further object of this invention to provide a process for the conversion of ortho-amino benzyl sulfoxides to ortho-methyl anilines that includes an effective separation of sulfur by-products.

It is a still further object of this invention to provide a process for the conversion of ortho-amnio benzyl sulfoxides to ortho-methyl anilines that does not include any potentially hazardous process step.

It is another object of this invention to provide a process for the conversion of ortho-amino benzyl sulfoxides to ortho-methyl anillines that employs only readily available reagents.

It is also another object of this invention to provide a useful process for the conversion of anilines derived from sulfilimine rearrangement to ortho-methyl anilines.

It is still another object of this invention to provide stable quaternary ortho-amino benzyl ammonium halide salts.

It is yet another object of this invention to provide a process for the conversion of ortho-amino benzyl sulfoxides to stable quaternary ortho-amino benzyl ammonium halide salts.

SUMMARY OF THE INVENTION

In one aspect, this invention provides a process for preparing an ortho-methyl aniline which comprises:

(a) reacting an ortho-amino benzyl sulfoxide with a nonoxidizing acid halide in an inert solvent to produce a solution of the corresponding ortho-amino benzyl halide and sulfur by-products;

(b) adding to the solution containing said ortho-amino benzyl halide and sulfur by-product a basic tertiary amine to form a quaternary ortho-amino benzyl ammonium halide salt;

(c) precipitating said quaternary salt while retaining the sulfur compounds in solution; and (d) cleaving said quaternary salt by catalytic hydrogenation to form an ortho-methyl aniline.

In another of its aspects, this invention contemplates stable quaternary ortho-amino benzyl ammonium halide salts, as well as the process for their production as described above.

This invention provides a facile means of converting ortho-amino benzyl sulfoxides to ortho-methyl anilines in high yields employing readily available reactants. Stable quaternary salts are formed which readily can be separated from the reaction medium and from the sulfur byproducts which result form the treatment of the sulfoxides with the acid halide. Failure to provide for an effective removal of sulfur compounds from the system, inter alia, results in decreased efficiency in subsequent hydrogenation because hydrogenation catalysts are susceptible to poisoning by sulfur. Since the substantially sulfur-free quaternary salts provided by this invention are stable, they do not require special handling procedures and can be stored for extended periods without decomposition.

Ortho-methyl anilines have a variety of known uses including use in the manufacture of herbicides and the like. The quaternary salts of the invention are valuable materials from which ortho-methyl anilines can be prepared.

DETAILED DESCRIPTION OF THE INVENTION

A wide variety of ortho-amino benzyl sulfoxides may be employed in the practice of this invention. Importantly, ortho-amino benzyl sulfoxides have been shown to convert readily to ortho-amino benzyl halides with an acid halide and such solution can then be treated in accordance with the further aspect of this invention to provide a substantially sulfur-free stable quaternary salt. A variety of other substituents can be present on the sulfoxide starting material without interfering with the reactions of this invention.

The sulfoxide starting materials may have, if desired, any of a variety of ring substituents in addition to the benzylic sulfoxide substituent. Such secondary nuclear substituents can include, for example, one or more substituents which are alkyl, haloalkyl, alkoxy, polyalkoxy or alkoxyalkyl, alkenyl, alkenyloxy, alkynyl or alkynyloxy, aryl, aryloxy, aralkyl, or aralkyloxy, amino, $NO_2$, CN, halogen, and saturated or unsaturated heterocyclic radical having up to 6 ring atoms containing O and/or N. Preferred secondary nuclear substituents include haloalkyl, such as $CF_3$; alkyl, such as methyl or ethyl; alkoxy, such as methoxy or ethoxy; halogen, such as Cl or Br; carboalkyoxy such as carbomethoxy; and CN. The amino group is an electron donating group that stabilizes the benzyl carbonium ion and results in the formation of the aniline when the benzyl sulfoxide is contacted with an acid halide. Care should, of course, be taken in the selection of secondary electron-withdrawing groups to avoid off-setting the activating effect of the amino group.

The aniline N can have one of a variety of substituents, if desired. Such substituents include, inter alia, alkyl or aryl substituent.

The term "benzylic sulfoxide substituent" is employed herein to refer to a —$CH_2SOR$ substituent. The R substituent can be any of a variety of organic substituents such as alkyl, aryl or the like as described above. Since this R group is cleaved from the final product, simple and inexpensive alkyl substituents such as $CH_3$ are preferred.

As used herein, the term "alkyl" refers to both straight chain and branched chain alkyl radicals, preferred are alkyls containing 1 to 6 carbon atoms such as methyl, ethyl, n-propyl, isopropyl, n-butyl isobutyl, sec-butyl, tert-butyl, n-pentyl, isopentyl, n-hexyl, sec-hexyl and the like; "aryl" refers to substituted and unsubstituted aromatic radicals such as phenyl, benzyl, tolyl, xylyl and the like; "alkoxy" refers to both straight chain and branched chain alkoxy radicals containing alkyl, alkenyl or alkynyl groups as defined herein; "carboalkoxy" refers to radicals of the formula $COOR_c$ where $R_c$ is an alkyl as defined above; and "amino" as applied to secondary ring substituents refers to radicals of the formula NRR' where R and R' can be hydrogen, and alkyl, aryl or any other substituent as defined above. "Alkenyl" refers to straight chain and branched chain alkenyl groups, of the type —$C_nH_{2n-1}$, preferred are those alkenyl groups containing 3 to 5 carbon atoms; "alkynyl" radicals are of the type —$C_nH_{2n-3}$ atoms and includes both straight chain and branched chain groups. Preferred alkynyl groups contain 3 to 5 carbon atoms. "Alkoxyalkyl" refers to an alkyl group, substituted on the terminal carbon by an alkoxy group.

The term "haloalkyl" refers to alkyl groups substituted by one or more halogen atoms, e.g., chloromethyl, bromomethyl, dichloroethyl, trichloromethyl, trifluoromethyl, pentafluoroethyl, iodomethyl and the like.

Of special interest are those starting materials comprising nuclear substituted ortho-amino benzyl sulfoxides. Of particular interest are 3-substituted-2-amino benzyl sulfoxides (to produce 2-6 di-substituted anilines). 3-trifluoromethyl-2-amino benzyl sulfoxides are especially preferred as starting materials for this invention.

The sulfoxide starting material for the processes of the present invention may be formed, inter alia, by known sulfilimine rearrangement from the corresponding aniline. In a typical reaction, an aniline is reacted with dimethyl sulfide in the presence of a base and an oxidizing agent, such as N-chlorosuccinimide, to provide an aromatic sulfilimine containing an —N═S—$C(CH_3)_2$ group. The free sulfilimine may be heated or subjected to catalysis to cause sulfilimine rearrangement to provide an ortho-methylthiomethyl aniline (an ortho-amino benzyl sulfide) which in turn can be oxidized to yield an ortho-methylsulfinylmethyl aniline (i.e., an aniline containing an ortho- $CH_2SOCH_3$ substituent—an ortho-amino benzyl sulfoxide). Such reactions are known and described, inter alia, is Gassman, Tetrahedron Letters 497 (1972), Gassman, Tetrahedron Letters, 24, 2055-2058 (1977), Vilsmeier, Tetrahedron Letters 624 (1972), Jackson U.S. Pat. Nos. 3,966,371 and 4,006,183, and Claus, Mh Chem. Bd. 102, pp. 1571-1582 (1971). In a variation of the sulfilimine reaction, when a base such as sodium hydroxide is used, the neutralization can be accompanied by a conversion of by-product succinimide to an aqueous solution of sodium succinimide which can be regenerated to a chlorosuccinimide. The sulfilimine rearranges upon heating or catalysis to provide ortho-methylthiomethyl anilines which can in turn be oxidized, for example, with hydrogen peroxide to yield the starting ortho-methylsufinylmethyl anilines. As described more fully later, ortho-amino benzyl sulfides may be converted to the ortho-amino benzyl sulfoxides and then to the ortho-benzyl halide in situ in the practice of this invention.

There are two preferred pathways to convert ortho-amino benzyl sulfides to ortho-amino benzyl sulfoxides. An ortho-amino benzyl sulfide may be oxidized as with hydrogen peroxide to form the corresponding sulfoxide. Alternatively, the sulfide may be contacted with a halogenating agent such as chlorine or sulfuryl chloride under anhydrous conditions to form a cyclic sulfilimine which thereafter may be contacted with water to form the ortho-amino benzyl sulfoxide starting material for the practice of this invention.

If the sulfoxide starting material is prepared by contacting a sulfide with a halogenating agent under anhydrous conditions (i.e., in an anhydrous inert organic solvent) followed by hydrolysis, the sulfoxide can be converted to the ortho-amino benzyl halide in situ if sufficient water (e.g., at least about a stoichiometric amount) is added. In this embodiment, the hydrogen halide generated in the formation and hydrolysis of the cyclic sulfilimine can supply the necessary acid halide to convert the sulfoxide to an ortho-amino benzyl halide in a single reaction vessel.

The ortho-amino benzyl sulfoxide starting material is contacted with a nonoxidizing acid halide in an inert solvent to produce an ortho-amino benzyl halide. The term "acid halide" as used herein, refers to agents which are capable of liberating a halide ion (i.e., chloro, fluoro, bromo or iodo) in situ. An acid halide for the purposes of this invention can be chosen from a wide variety of acid derivatives such as those derived from sulfonic acids, phosphoric acids, phosphonic acids, and carboxylic acids having an organic moiety that may be alkyl, haloalkyl, phenyl, benzyl or substituted derivates thereof. Included in this class of materials are acyl halides such as acetyl chloride, and haloacetyl halides such as chloroacetyl chloride. Acid halides also, of course, include hydrogen halides and, indeed, hydrogen chloride is a preferred acid halide. In general, acid halides used in the normal Pummerer reaction can be employed in the abnormal Pummerer reaction described herein. The reaction of the ortho-amino benzyl sulfoxide and the acid halide may be carried out in any of a variety of inert solvents, such as a hydrocarbon, chlorohydrocarbon, ether solvents or the like. Representative solvents include carbon tetrachloride, toluene, xylene, chlorobenzene, chloroform, methylene chloride, ethylene dichloride, trichloroethylene. A preferred solvent is ethylene dichloride.

The ratios of reactants in the above-described process are dictated primarily by economic considerations and avoidance of unwanted byproducts. Hence, large excesses of deficiencies of any expensive component relative to another component should be avoided and essentially stoichiometric ratios are often preferred. Concentrations of reactants employed can affect product yield. In general, reactant concentrations of from about 0.1M up to about 1.5M can be employed, and yields tend to be optimum at or near approximately 0.5M concentration.

The procees may be carried out at any convenient temperature ranging from 0° C. to ambient or higher. Thus, reaction temperatures of from about 0° to about 200° C. can be broadly employed. In practice, however, it is preferred to employ temperatures in the range of from about 40° to about 120° C., with temperatures of from about 50° to about 85° C. being the most preferred for the reaction. The process may be carried out under any convenient pressure either above or below atmospheric. For practical considerations, however, atmospheric conditions are preferred. The reaction proceeds rapidly. The choice of temperatures, pressures, equipment and the like to suit any particular set of reactants is within the skill of the art. The process also may be carried out, of course, either batchwise or continuously. In the preferred embodiment, the sulfoxide reactant is dissolved in the inert solvent with mixing and gaseous acid halide reagent is admitted, e.g., bubbled through the mixture. In most cases, it is desirable to remove water formed in the reaction by distilling the mixture until the reaction product is essentially anhydrous. Distillation also serves to insure removal of unreacted acid halide.

The conversion of the ortho-amino benzyl sulfoxide to ortho-amino benzyl halide as described above may be characterized as an abnormal Pummerer reaction. This reaction proceeds to the ortho-amino benzyl halide rather than to an aldehyde as in the case with a normal Pummerer reaction.

One of the applicants of the present invention together with another employee of the assignee of the present invention discovered the abnormal Pummerer reaction and its applicability, inter alia, in conversion of ortho-amino benzyl sulfoxides to amino benzyl halides. That process as well as the conversion of benzyl sulfides to benzyl sulfoxides is described in greater detail in the co-pending U.S. patent application of Chupp and Balthazor entitled "Preparation of Substituted Benzylic Halides" filed on even date herewith, commonly assigned herewith, and hereby incorporated by reference.

The conversion of the ortho-amino benzyl halide obtained via the above-described abnormal Pummerer reaction to a stable, easily isolated, substantially sulfur-free quaternary salt is an important feature of one aspect of the present invention. Precipitation of the quaternary amine salt is effected in such a manner as to ensure that substantially all sulfur-containing by-products are separated from the quaternary aniline salt which can then be subsequently cleaved efficiently by hydrogenation. As is well known in the art, many metal hydrogenation catalysts, are extremely sensitive to sulfur poisoning.

A basic tertiary amine is added to the reaction mixture containing ortho-amino benzyl halide and sulfur compounds to react with the orthoamino benzyl halide and form quaternary ortho-amino benzyl ammonium halide salts, having a formula: $Ar\ CH_2N(R)_3^+X^-$, wherein Ar is an ortho-amino aryl group, R is the organic moiety of the basic tertiary amine, and X is halogen. A strongly basic tertiary amine is employed in the practice of this invention. The preferred basic tertiary amines are highly nucleophilic. Such amines include the lower alkyl tertiary amines having, for example, up to about 4 carbon atoms in one or more of the substituent chains, and can also include aromatic tertiary amines.

Trimethyl amine is readily available, inexpensive, and is a particularly preferred basic and nucleophilic tertiary amine for the practice of this invention.

The ortho-amino benzyl halide generally is reacted with the tertiary amine at temperatures from about 0° C. to about 60° C. and preferably from about 40° C. to about 50° C. The reaction is exothermic and requires a finite period of time, often at least about 10 minutes. Reaction temperatures, time and the like are easily within the skill of the routineer.

It surprisingly has been determined that the ionic quaternary salt can be preferentially precipitated to provide readily filterable, stable nonhygroscopic crystals that are substantially free of occlusions of sulfur co-products. The crystals of this invention can be precipitated by controlling concentrations and temperatures of a solvent solution.

In an alternate procedure, a co-solvent for the quaternary salt is added to the reaction mixture. After the reaction is completed, the co-solvent can be removed by distillation. The solubility of the quaternary salt in the solvent-co-solvent is less than its solubility in the solvent-alcohol mixture and removal of co-solvent results in a mixture which has a limited solubility for the quaternary salt. The distillation can be continued to remove substantially all of the co-solvent and such amount of the solvent as is desired can also be removed. Indeed, crystallization of the salt can begin during the latter stages of the distillation. Sufficient solvent should remain after distillation, however, to maintain the sulfur compounds in solution. Upon subsequent cooling, the quaternary salt continues to precipitate and the sulfur compounds remain in solution.

The boiling points of the co-solvent and solvent should be correlated so that the co-solvent has a lower boiling point than the solvent to permit the co-solvent to be removed by distillation. The solvent that is selected should have limited capability to dissolve the ionic quaternary compound but have the ability to retain the sulfur compounds in solution at quaternary salt crystallization temperatures. The choice of a co-solvent and solvent from among the many available and the determination of appropriate amounts of solvent and co-solvent for any given combination of reactants can readily be determined employing simple solubility tests.

An alcohol is a preferred co-solvent. The alcohol desirable is a lower alkyl alcohol such as, for example, an alcohol having not more than about 4 carbon atoms. Methyl alcohol is particularly preferred for the practice of this invention. The alcohol can be added concurrently with or after the addition of the tertiary amine and generally is added in sufficient amounts to maintain the quaternary salt in solution at reaction temperatures. The alcohol serves two functions. On the one hand, it functions as a co-colvent and it also enhances the reaction between the benzyl halide and the tertiary amine.

Precipitation of the quaternary salt can be initiated by seeding the solution with quaternary salt crystals. Indeed, the solution is desirably seeded as it approaches a saturation during the distillation and the distillation is thereafter continued after preliminary crystallization occurs. Thereafter, the liquid is cooled to complete crystallization. The solution is normally cooled to ambient or below to complete crystallization and often cooled to below about 15° C.

The quaternary salt is easily filtered, non-hygroscopic and innocuous. Moreover, the resulting quaternary salt does not polymerize or react with alcohols or water. Accordingly, a wide range of solvents and reaction conditions can be utilized in the subsequent hydrogenation step. In addition, the salt is also more amenable to purification by known techniques.

While the quaternary salt, as precipitated, is sufficiently free of suflur contaminates to permit further processing, it is possible to purify the salt even further by washing with a solvent for the impurities. Although it is generally less economically attractive, the quaternary salt can, of course, also be dissolved and reprecipitated.

Preferred quaternary salts of this invention are 3-trifluoromethyl-2-amino benzyl ammonium halide, 3-cyano-2-amino benzyl ammonium halide, 3-methyl-2-amino benzyl ammonium halide, 3-ethyl-2-amino benzyl ammonium halide, 3-methoxy-2-amino benzyl ammonium halide, 3-carbomethoxy-2-amino ammonium halide, and 4-chloro-3-methoxy-2-amino benzyl halide. Particularly preferred salts are those wherein the amino group is $NH_2$, the halide is chlorine and/or the slat is a trimethyl amine salt.

In the final step of the process of the present invention, the quaternary salt is hydrogenated while dissolved in a suitable solvent, with hydrogen in the presence of a metal hydrogenation catalyst. The quaternary ammonium salt hydrogenation is preferably carried out at elevated temperatures and pressures.

Peferred hydrogenation catalysts are metal catalysts, such as palladium, platinum, rhodium, nickel, and the like which most often are available on porous supports. Most preferred are palladium on charcoal catalysts which are commercially available in concentrations of 1 to 10% palladium. The supported catalysts are generally present in amounts less than 10% by weight of the reaction mixture. The temperature broadly may range from about 10° C. to about 100° C., typically from about 20° C. to 40° C., and pressures may range from about 50 psig to about 800 psig. While many solvents can be employed, preferred solvents for this reaction are alcohols, alcohol/water mixtures, or water. Hydrogenation conditions for any given circumstance once again can readily be determined by one skilled in the art.

The ortho-methyl aniline resulting from the hydrogenation step can be recovered by filtration, washing, drying, or the like. Purification of this final product is generally not necessary due to the high state of purity which results from the reactions of this process.

The process of this invention can often provide yields of over 85% based on the starting ortho-amino benzyl sulfoxide.

The following examples are included to better illustrate the practice of this invention. These examples are included for illustrative purposes only and are not, in any way, intended to limit the scope of the invention.

EXAMPLE 1

Chlorine (74.0 grams, 1.04 mol) was passed into a solution of 221.4 grams (1.002 mol) of 2-methylthiomethyl-6-trifluoromethyl aniline in 2.08 liters (L) of ethylene dichloride at 15°–22° C. over a 35 minute period. The cloudy solution was then treated with 25 ml (1.39 mol) of $H_2O$ and heated to 63° C. After 20 minutes at 63° C. the mixture turned to a clear light orange solution. Excess water was removed by azeotropic distillation (650 ml of solvent was removed) and the light yellow solution was cooled to 10° C. Fresh ethylene dichloride (1.05 L) was added followed by 100 grams (1.7 mol) of trimethylamine in 130 ml of methanol. The mixture warmed at 20° C. and after 15 minutes was heated to 40° C., held for 15 minutes, and then heated to boiling. Excess trimethylamine and methanol were removed by distillation. When the distillation head temperature reached 70° C. the solution was seeded to initiate crystallization of the quaternary salt. Distillation was terminated when the head temperature reached 81.5° C. (1.05 L of solvent had been removed) and the slurry was cooled to 5° C. The mixture was filtered and the solids washed with fresh ethylene dichloride and dried to give 229.0 grams (85.1%) of white quaternary ammonium salt having a melting point of 220°–221° C. The product is 2-amino-3-trifluoromethyl ammonium chloride.

Analysis Calculated for $C_{11}H_{16}N_2Cl_1F_3$: C, 49.2; H, 5.96; N, 10.4; Cl, 13.2; Found: C, 49.13; H, 6.01; N, 10.37; Cl, 13.31.

EXAMPLE 2

Chlorine (10.19 g, 0.1435 mol) was passed through a solution of 30.03 grams (0.1359 mol) of 2-methylthiomethyl-6-trifluoromethyl aniline in 160 ml of ethylene dichloride at 20°–25° C. Water (3.8 ml, 0.21 mol) was added to the mixture (cloudy) was heated to 61°–63° C. and maintained for 20 minutes. The resulting clear solution was heated to boiling and excess water was removed by azeotropic distillation (60 ml of solvent were removed). The solution was cooled to 8° C. and 20 ml of trimethyl amine was added in 14 ml of methyl alcohol. The temperature of the mixture rose to 35° C., then 100 ml of ethylene dichloride was added, and after 10 minutes, the mixture was heated to boiling. Excess trimethyl amine and methyl alcohol were distilled out. At a distillation head temperature of 70° C., the solution was seeded to initiate crystallization. The distillation was terminated at a head temperature of 81.5° C. and the slurry was cooled to 8° C., filtered and the solids were washed with 100 ml of fresh ethylene dichloride to give a yield of 28.16 grams (77.2%) of quaternary ammonium salt.

EXAMPLE 3

A solution of 20.0 gams (0.0844 mol) of 2-methylsulfinylmethyl-6-trifluoromethyl aniline in 250 ml of ethylene dichloride was added to a 500 ml round bottom flash equipped with an efficient stirrer, HCl inlet tube, distilling head and thermometer. The solution was treated at room temperature with gaseous HCl until an initial tacky precipitate gave way to cloudy mixture (3–5 minutes). The mixture was then heated rapidly to 60° to 63° C. while HCl was bubbled through the mixture. After 10 minutes of heating and HCl treatment, 1 ml of $H_2O$ was added and heating and HCl treatment were continued until the mixture became clear (generally 10–15 mintues after $H_2O$ addition) (often a very small amount of insoluble material will be observed on the sides of the flask at this point). The resulting clear orange solution contained 2-chloromethyl-6-trifluoromethyl aniline and the principal sulfur byproducts of the reaction, $CH_3SH$ and $CH_3SO_2SCH_3$. This solution, after azeotropic removal of water and HCl, can be treated in the manner described in Example 1 with trimethylamine and methanol to produce the quaternary ammonium salt of this aniline substantially free of the sulfur by-products.

EXAMPLE 4

A solution of 18.35 grams (0.06834 mol) of quaternary ammonium salt produced according to Examples 1 or 2 in 100 ml of methanol and 50 ml of water was shaken over 0.5 grams (2.7 weight percent) of 5% palladium supported on carbon (Pd/C) catalyst at 45° C. under 50 psig hydrogen pressure for one hour. The mixture was then filtered, diluted with 100 ml of $H_2O$ and extracted with two 100 ml portions of methylene dichloride. The organic layer was dried ($MgSO_4$) and evaporated to give 11.7 gram (97.8%) of 2-methyl-6-trifluoromethyl aniline.

EXAMPLE 5

The solution of 229.0 grams (0.8529 mol) of the quaternary ammonium salt of Examples 1 or 2 in 500 ml of methanol of 250 ml of water was stirred under 700 psig $H_2$ pressure over 7.0 grams (3.06 weight percent) of 5% Pd/C catalyst. The mixture was heated to 100° C. ($H_2$ uptake began at 75° to 80° C.) and maintained for 2.5 hours. The solution was then filtered, diluted with 2 L of $H_2O$ and extracted with three 250 ml portions of methylene dichloride. After drying ($MgSO_4$) and evaporation, 140.2 grams (93.9%) of 2-methyl-6-trifluoromethyl aniline was obtained.

EXAMPLE 6

A solution of 25.0 grams (0.0931 mol) of quaternary ammonium salt as prepared in Example 1 or 2 in 125 ml of $H_2O$ was shaken with 0.75 grams (3.0 weight percent) of 5% Pd/C catalyst under 48–56 psig hydrogen at 50° C. for 17 hours. The mixture (two layers) was filtered, 100 ml of methylene dichloride were added and the organic layer was dried ($MgSO_4$) and evaporated to yield 15.4 grams (94.5% of 2-methyl-6-trifluoromethyl aniline).

Since modifications will be apparent to those skilled in the art, it is intended that this invention be limited only by the scope of the appended claims.

We claim:

1. The process for preparing ortho-methyl anilines which comprises:
   (a) reacting an ortho-amino benzyl sulfoxide with a nonoxidizing acid halide in an inert solvent to produce a solution of the corresponding ortho-amio benzyl halide and sulfur by-products;
   (b) adding to the solution containing said ortho-amino benzyl halide and sulfur by-products a basic tertiary amine to form a quaternary ortho-amino benzyl ammonium halide salt;
   (c) precipitating said quaternary salt while retaining the sulfur compounds in solution; and
   (d) cleaving said quaternary salt by catalytic hydrogenation to form an ortho-methyl aniline.
2. The process of claim 1 wherein said starting sulfoxide is an ortho-methylsulfinylmethyl aniline.
3. The process of claim 1 wherein said starting sulfoxide is a 3-substituted-2-amino benzyl sulfoxide.
4. The process of claim 1 wherein said staring sulfoxide is a 3-trifluoromethyl-2-amino benzyl sulfoxide.
5. The process of claim 1 wherein said starting sulfoxide is 2-methylsulfinylmethyl-6-trifluoromethyl aniline.
6. The process of claim 1 wherein said acid halide is selected from the group consisting of acyl halides, haloacyl halides and inorganic acid halides.
7. The process of claim 6 wherein said acid halide is hydrogen halide.
8. The process of claim 1 wherein said tertiary amine is trimethyl amine.
9. The process of claim 1 wherein a solvent-co-solvent mixture is employed in step (d).
10. The process of claim 9 wherein said co-solvent is a lower alkyl alcohol.
11. The process of claim 10 wherein said co-solvent is methanol.
12. The process of claim 1 wherein a 3-trifluoromethyl-2-amino benzyl sulfoxide is reacted with hydrogen chloride in step (a) and trimethyl amine and methyl alcohol are employed in step (b).
13. The process of claim 1 wherein said solution of quaternary salt is seeded to aid crystallization.
14. The process of claim 1 wherein said ortho-amino benzyl sulfoxide is produced by in situ reaction of an ortho-amino benzyl sulfide with a halogenating agent to produce an aromatic cyclic sulfilimine intermediate which is rearranged by addition of water to ortho-amino benzyl sulfoxide.
15. The process of claim 1 wherein said ortho-amino benzyl sulfoxide is derived from a ortho-amino benzyl sulfide produced by an aniline sulfilimine rearrangement.

* * * * *